Oct. 28, 1952 — L. C. ATWOOD ET AL — 2,615,729
BICYCLE KICK STAND
Filed Oct. 15, 1948
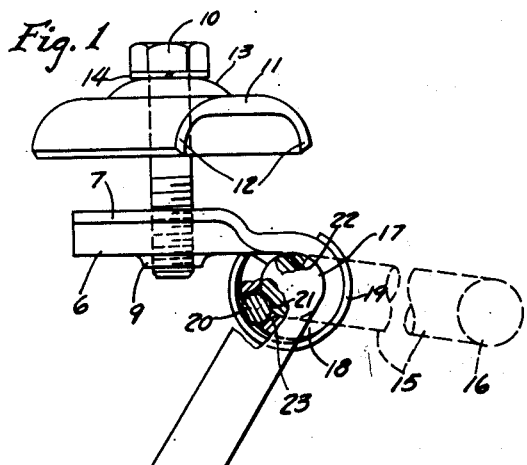
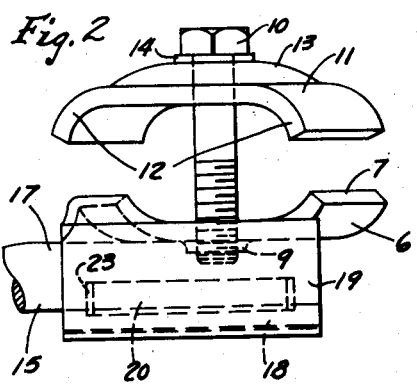
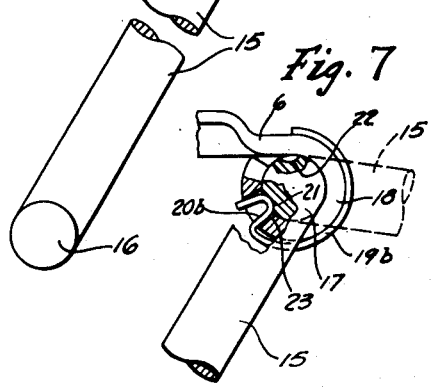
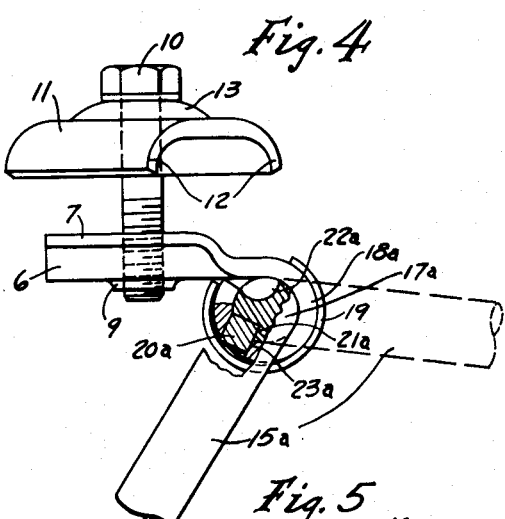
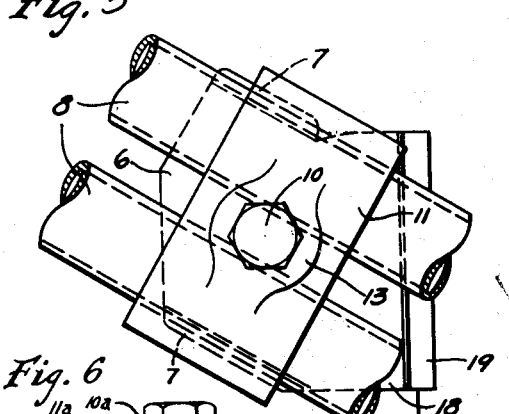
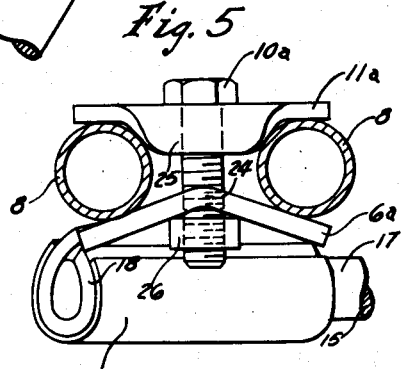
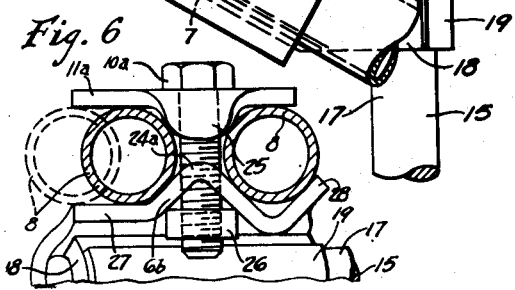
INVENTORS
Lyle C. Atwood
Howard W. Clay
Andrew F. Winterman
ATTY.

Patented Oct. 28, 1952

2,615,729

UNITED STATES PATENT OFFICE 2,615,729

BICYCLE KICK STAND

Lyle C. Atwood and Howard W. Clay, Rockford, Ill., assignors to Atwood Vacuum Machine Company, Rockford, Ill., a corporation of Illinois Application October 15, 1948, Serial No. 54,744

14 Claims. (Cl. 280—301)

This invention relates to a new and improved bicycle kick stand.

Bicycle kick stands have heretofore been of rather large and cumbersome design, considering the simplicity of their intended function. As a result they were an entirely too conspicuous and a much more utilitarian than enhancing item on the bicycles to which they were attached. Furthermore, many were so designed that their kick operation placed too great a shock and strain upon their mounting and as a result the stands soon worked loose and their attaching bolt or bolts had to be tightened frequently. Usually too, the designed were such that the bearing journal end of the supporting leg had an insufficient length of bearing surface to work in, in relation to the loads imposed upon this part in service, and, as a result, the bearing and journal were subjected to excessive wear and the supporting leg soon became too loose for safe or dependable support of the bicycle, so that replacement of the stand was necessary. It is, therefore, the principal object of our invention to provide a kick stand of novel design aimed at avoiding the foregoing and other objections noted in kick stands previously available.

The salient feature of the kick stand of our invention is the use of a longitudinally split sleeve spring, herein called a C-spring, because of the C-shape of its cross-section, surrounding the journal bearing for the swingable supporting arm and cooperating, in the preferred form, with an elongated detent pin extending lengthwise of the bearing in a slot provided in the wall thereof to urge the pin inwardly in a radial direction relative to said bearing to engage selectively in either of two circumferentially spaced detent grooves or recesses provided in the journal end portion of the supporting leg entered in said bearing, the said grooves being just deep enough in relation to the pressure exerted by said spring so that said leg provides a reliable support for the bicycle in its extended operative position, while, on the other hand, there is sufficient leverage with the supporting leg in relation to the holding force of the spring and detent pin to permit disengaging the pin from the groove and moving it with reasonably light foot pressure from one extreme position to the other. The bearing is located in the closest possible proximity to the plane of the attaching bracket or plate, namely, as a tangential continuation of one end thereof, thereby reducing to a minimum the cantilever action incident to the use of the stand for support and swinging the supporting leg from one extreme to the other relative to the attaching bracket, so that there is no likelihood of the bracket working loose and requiring tightening. Furthermore, because there is nothing in this design to interfere with making the journal bearing of adequate length so as to reduce the unit bearing pressure proportionately, and the bearing is moreover effectively shielded by the C-spring to retain lubricant and exclude dirt and water, it follows that wear is accordingly reduced to a minimum and the stand will give good service for a much longer time than has heretofore been considered common for such devices.

In one modified form, a detent pin that is rectangular in cross-section is used and cooperates with V-shaped grooves in the journal portion of the supporting leg so as to afford a positive stop for the supporting leg when the same reaches the operative position.

In another modified form a detent projection takes the place of the detent pin and is provided as an integral part of the split sleeve spring, extending radially inwardly from one side of the split portion through the slot in the bearing for cooperation with the detent grooves in the journal.

The invention is illustrated in the accompanying drawing in which:

Fig. 1 is a side view of a kick stand made in accordance with our invention, a portion of the supporting leg being broken away to save space and permit showing the structure on a larger scale, and portions of the bearing and journal entered therein being shown in section to better illustrate the mode of operation;

Fig. 2 is a back view;

Fig. 3 is a top view, showing the associated portions of the bicycle rear fork on which the device is mounted;

Fig. 4 is a view like Fig. 1 showing a modified or alternative construction insofar as the detent pin and groove are concerned;

Figs. 5 and 6 are front views of other kick stands showing modified or alternative constructions insofar as the attaching plate or bracket is concerned, and Fig. 7 is a sectional detail corresponding to a portion of Fig. 1 but showing a further modified or alternative construction insofar as the sleeve spring is concerned, this one being formed to serve both as the sleeve spring and detent.

Similar reference numerals are applied to corresponding parts in these seven views.

Referring first to Figs. 1 to 3, the reference numeral 6 designates the sheet metal attaching plate or bracket for our improved kick stand which has upwardly curved lateral edge portions 7 for locating abutment with the outer sides of the spaced substantially parallel, horizontal bars 8 of the bicycle rear wheel fork and has a downwardly extruded neck 9 in the center thereof that is internally threaded to receive the threaded lower end of the single fastening bolt 10, a single bolt being practical here because the cooperating clamping plate 11 is similarly provided with downwardly curved lateral edge portions 12 for locating abutment with the bars 8 from above. The central portion of the plate 11 is embossed upwardly for reinforcement, as at 13, where the hole for bolt 10 is provided, and a lock washer 14 is preferably provided under the head of bolt 10 to prevent loosening. The bent rod supporting leg 15 for propping the bicycle has an outwardly directed lower end 16 for contact with the ground or other supporting surface and a horizontal inwardly directed upper end 17 for operation as a journal in the curled end 18 of the bracket 6 which serves as a bearing therefor, this bearing being in acute angle relation to the bars 8, as appears in Fig. 3, so as to locate the ground engaging end 16 of the leg 15 far enough away from the bicycle for proper support when the leg 15 is turned through nearly 120° from a nearly horizontal retracted position indicated in dotted lines in Fig. 1, wherein it is substantially parallel to and alongside the bicycle rear wheel fork, in the usual way, to the operative position shown in full lines in Fig. 1. The bearing 18, as clearly appears in Fig. 1, is a substantially tangential continuation of the bracket 6, and the importance of this from the standpoint of reducing the troublesome cantilever effect to a minimum will soon appear. It will suffice at this point merely to call attention to the fact that the bearing 18 is of ample length and that the journal 17 extends the full length thereof so that the unit bearing pressure in this construction is reduced far below what has been common for devices of this kind in the past. The bearing 18 is rather tightly enclosed by a split sleeve spring 19 substantially its full length, and this spring, sometimes referred to as a C-spring, because of its C-shaped cross-section, serves to press a cylindrical detent pin 20 into whichever one of two rounded grooves 21 and 22 in the journal 17 is brought into register with the slot 23 in the bearing 18, the pin 20 being caged in said slot and having an easy working fit therein. The pin 20 causes the spring 19 to be spread to an appreciable extent when the pin is seated in either of the grooves 21 and 22, as appears in Fig. 1, but when the leg 15 is turned to turn the journal 17 and accordingly force the pin 20 to ride out of the groove the spring is spread much more, as must be clear from a study of Fig. 1, and hence the spring is loaded enough so that it will snap the pin back into the other groove under heavier spring pressure as soon as that groove comes into register with the slot. The slot 23 terminates short of the ends of the bearing 18, as appears in Fig. 2, and the pin 20 is slightly shorter than the slot so that it will work freely therein. The grooves 21 and 22 are circumferentially spaced about 120°, more or less, and are so related to the leg 15 so that when pin 20 is seated in groove 22 the leg is supported releasably in the raised, substantially horizontal retracted position indicated in dotted lines in Fig. 1, and when pin 20 is seated in groove 21 the leg is supported in the lowered operative position shown in full lines in Fig. 1. The groove 21 should be and preferably is a trifle deeper than groove 22 inasmuch as there is no strain upon the leg 15 in raised position whereas the leg 15 assumes the load incident to propping the bicycle when in its operative position. However, both grooves are just deep enough in relation to the pressure exerted by spring 19 so that the leg 15 provides a reliable support in its operative position, while, on the other hand, they are shallow enough in relation to the spring pressure of spring 19 and the leverage afforded by leg 15 in turning the same from one extreme position to the other so that it can be moved one way or the other with reasonably light foot or hand pressure. It is particularly in the kick operation of the leg 15 from one extreme to the other that the close proximity of bearing 18 to the plane of plate 6 becomes so important from the standpoint of reducing to a minimum the cantilever action incident to swinging the leg 15 to turn the journal 17 in the bearing 18 against the resistance afforded by spring 19, pin 20, and groove 21 or 22, because the shocks and strains that were heretofore responsible for loosening the kick stand are thereby reduced to an extent where tightening of bolt 10 should never be necessary after the kick stand has once been properly applied to the bicycle. The good bearing afforded in the present construction for journal 17 plus the fact that graphite or other lubricant can be packed in the structure at the factory at the time of assembling and is thereafter shielded in service by the spring 19 against loss and against contamination by dirt and water account for the durability of the present device, even without any oiling.

The construction shown in Fig. 4 is the same except that leg 15a has cooperating with its journal 17a a detent pin 20a of square cross-section which slides in a slot 23a one side of which extends substantially radially, as shown, and the other side of which is parallel thereto, the pin being arranged to enter either of two grooves 21a and 22a in the journal 17a. With this construction it is manifest that, because the pin 20a has its one side disposed in a plane extending substantially radially with respect to the journal 17a and parallel to the opposite edge of the slot 23a in which the pin 20a is guided and the journal has a matching groove 21a, the pin forms a positive stop for the journal 17a preventing further turning in a clockwise direction when the leg 15a reaches operative position. However, because the other side of the pin 20a is at right angles to the aforesaid radial plane, it should be clear that the journal 17a may be turned relatively easily in a counter-clockwise direction to the dotted line retracted position. The groove 22a, on the other hand, is arcuate shaped, like the groove 22 in Figs. 1 and 7, so that it gives only a detent action in either direction of relative rotation. Hence, when the leg 15a is in the retracted position, it can be moved to the operative position with the same ease with which it is returned to the retracted position. This design may require a little heavier foot or hand pressure to turn it from one position to the other, assuming the same spring 19 is used. However, a lighter spring may be used to make this design feasible.

In Fig. 5 the stand is the same as in Figs. 1 to 3 so far as the supporting leg 15 and spring 19 cooperating with bearing 18, journal 17 and detent pin 20 are concerned but the attaching plate or bracket 6a is of a different design for wider adaptability to different designs of bicycles, the same being of inverted V form as shown, so that the apex or ridge 24 of the V projects up in between the spaced bars 8 of the rear fork so as not to turn out of a proper position. The bearing 18, which is a curled extension of one end of the V-shaped plate 6a, will be disposed at the angle indicated in Fig. 3. The clamping plate 11a is of generally rectangular form with downwardly bent tapered lugs 25 on the front and rear edges that fit nicely between the bars 8, as shown, to locate the plate, while serving also as reinforcement for the plate to resist buckling thereof when the single bolt 10a that extends through registering center holes in the plates 11a and 6a is tightened, this bolt being threaded in a nut 26 that is disposed in the crotch of the V of the plate 6a and is thereby held against turning.

In Fig. 6 the stand is closely similar to that of Fig. 5, the supporting leg and spring 19 cooperating with bearing 18, journal 17, and detent pin 20 being all the same as in Figs. 1 to 3, but the attaching plate or bracket 6b being of a different design from the bracket 6a, with a view to still wider adaptability to different designs of bicycles. It will be noticed that the bracket 6b has not only the inverted V-form, like the bracket 6a, providing an apex or ridge portion 24a on the V that is arranged to project up in between the spaced bars 8 of the rear fork to prevent the plate turning out of a proper position, but there is, in addition, a horizontally extending edge portion 27 on one side and an upwardly inclined edge portion 28 on the other side to bear against the bottoms of bars 8 on different bicycles where the bars are spaced differently, as indicated by the dotted line showing of one of the bars 8 in this figure. It will be noticed that the right hand bar fits in the trough of the V formed by the upwardly bent edge portion 28 and the adjoining side of the inverted V, the apex portion of which is numbered 24a, so that regardless of where the other bar on the left lies with respect to the inverted V, namely, whether it engages the left hand side of the inverted V, as shown in full lines, or whether it is spaced outwardly therefrom, as indicated in dotted lines, the plate 6b is held securely against turning out of its proper position. The horizontally extending edge portion 27 is wide enough to accommodate an appreciable range of spacings of the bars 8. The bearing 18, which is a curled extension of one end of the plate 6b, is disposed at the angle indicated in Fig. 3 in relation to the plate. The clamping plate 11a is like that shown in Fig. 5, namely, of generally rectangular form with downwardly bent tapered lugs 25 on the front and rear edges that fit neatly between the bars with at least one edge portion of these lugs in engagement with the side of one of the bars to locate the plate, the lugs serving also as reinforcement for the plate to resist buckling thereof when the single bolt 10a that extends through registering center holes in the plates 11a and 6b is tightened, this bolt being threaded in a nut 26 that is disposed in the crotch of the inverted V of plate 6b and is thereby held against turning.

The device of Fig. 7 is the same as either of the others in so far as the attaching plate or bracket 6 or 6a and the cooperating clamping plate 11 or 11a and bolt 10 or 10a are concerned, but in this form the C-spring 19b includes an integral, radially inwardly projecting detent projection 20b working through slot 23 in bearing 18 to enter either of the detent grooves 21 and 22 provided in journal 17, whereby to afford all of the advantages and kind of operation as either of the other structures with one less part, the C-spring 19b serving the same purposes as the two parts 19 and 20 in Fig. 1 or 19 and 20a in Fig. 4. The U-shape of the projection 20b may be changed to a V-shape to fit V-shaped grooves in journal 17, and, if desired, the shape of the projection may conform in angularity to the grooves 21a and 22a of Fig. 4, so as to afford the positive stop feature described in that construction.

It is believed the foregoing description conveys a good understanding of the objects and advantages of my invention. The appended claims have been drawn to cover all legitimate modifications and adaptations.

We claim:

1. A device of the character described comprising a tubular bearing, a supporting leg having an angularly extending cylindrical end portion fitting in said bearing as a journal, said bearing having a longitudinal slot provided therein and said journal having circumferentially spaced longitudinal grooves provided therein arranged to register with said slot in different positions of angular adjustment of said supporting leg relative to said bearing, and a split sleeve spring tightly enclosing more than half of said bearing measured circumferentially pressing a detent element inwardly in said slot toward engagement in whichever groove is in register with said slot.

2. A device of the character described comprising a tubular bearing, a supporting leg having an angularly extending cylindrical end portion fitting in said bearing as a journal, said bearing having a longitudinal slot provided therein and said journal having circumferentially spaced longitudinal grooves provided therein arranged to register with said slot in different positions of angular adjustment of said supporting leg relative to said bearing, an elongated detent element extending lengthwise relative to said journal and movable in said slot bodily in a generally radial direction relative to the journal toward engagement in whichever groove is in register with said slot, and a split sleeve spring which is spread open for tightly enclosing more than half of said bearing measured circumferentially, including the slotted portion thereof, and engaging said detent element so as to press the same inwardly toward operative relationship to the journal.

3. A device of the character described comprising a tubular bearing, a supporting leg having an angularly extending cylindrical end portion fitting in said bearing as a journal, said bearing having a longitudinal slot provided therein and said journal having circumferentially spaced longitudinal grooves provided therein arranged to register with said slot in different positions of angular adjustment of said supporting leg relative to said bearing, and a split sleeve spring which is spread open for tightly enclosing more than half of said bearing measured circumferentially and having an inwardly extending end portion elongated lengthwise relative to said journal and movable in said slot under the contractive force of said spring toward engagement in whichever groove is in register with said slot.

4. A device of the character described comprising a tubular bearing, a supporting leg having an angularly extending cylindrical end portion fitting in said bearing as a journal, said journal having circumferentially spaced detent recesses provided therein arranged to register with a substantially radial opening provided in said bearing in different positions of angular adjustment of said supporting leg relative to said bearing, and a split sleeve spring tightly enclosing more than half of said bearing measured circumferentially and urging a detent element inwardly in said opening toward engagement in whichever recess registers with said opening.

5. A device of the character described comprising a tubular bearing, a supporting leg having an angularly extending cylindrical end portion fitting in said bearing as a journal, said journal having circumferentially spaced detent recesses provided therein arranged to register with a substantially radial opening provided in said bearing in different positions of angular adjustment of said supporting leg relative to said bearing, a detent element movable inwardly in said opening toward engagement in whichever recess is in register with said opening, and a C-spring which is spread open and tightly embraces said bearing circumferentially and engages said detent element so as to press it inwardly toward operative relationship to said journal.

6. A device of the character described comprising a tubular bearing, a supporting leg having an angularly extending cylindrical end portion fitting in said bearing as a journal, said journal having circumferentially spaced detent recesses provided therein arranged to register with a substantially radial opening provided in said bearing in different positions of angular adjustment of said supporting leg relative to said bearing, and a C-spring which is spread open to tightly embrace said bearing circumferentially and has an inwardly extending end portion projecting through said opening and urged under the contractive force of said spring toward engagement in whichever recess is in register with said opening.

7. A device of the character described comprising a tubular bearing, a supporting leg having an angularly extending cylindrical end portion fitting in said bearing as a journal, said bearing having a longitudinal slot provided therein intermediate the ends thereof and said journal having circumferentially spaced longitudinal grooves provided therein of substantially equal length and located intermediate the ends of said journal for registration with said slot in different positions of angular adjustment of said supporting leg relative to said bearing, said grooves being of arcuate form in transverse section, an elongated detent pin of cylindrical form and of a radius to conform substantially to the grooves and protrude to some extent outwardly from said slot even when engaged in one of said grooves, and a split sleeve spring which is spread open and tightly encloses said bearing, said spring being longer than said slot and arranged to cover the same and bear against the protruding portion of said pin to urge the same inwardly toward operative relationship to the journal.

8. A device of the character described comprising a tubular bearing, a supporting leg having an angularly extending cylindrical end portion fitting in said bearing as a journal, said bearing having a longitudinal slot provided therein intermediate the ends thereof and said journal having circumferentially spaced longitudinal grooves provided therein of substantially equal length and located intermediate the ends of said journal for registration with said slot in different positions of angular adjustment of said supporting leg relative to said bearing, an elongated detent pin of polygonal cross-section providing opposed parallel surfaces slidably engaging the sides of the slot in the bearing as guides and providing a V-shaped edge portion longitudinally thereof to engage in either of the grooves, said pin being of such sectional dimensions as to protrude to some extent outwardly from said slot even when engaged in one of said grooves, and a split sleeve spring which is spread open and tightly encloses said bearing, said spring being longer than said slot and arranged to cover the same and bear against the protruding portion of said pin to urge the same inwardly toward operative relationship to the journal.

9. A device of the character described comprising a tubular bearing, a supporting leg having an angularly extending cylindrical end portion fitting in said bearing as a journal, said bearing having a longitudinal slot provided therein intermediate the ends thereof and said journal having circumferentially spaced longitudinal grooves provided therein of substantially equal length and located intermediate the ends of said journal for registration with said slot in different positions of angular adjustment of said supporting leg relative to said bearing, said grooves being of arcuate form in transverse section, and a split sleeve spring which is spread open and tightly encloses said bearing, said sleeve having a U-shaped end portion projecting inwardly through said slot and urged inwardly under the contractive force of said spring for engagement of its arcuate inner extremity in either of said grooves, the radius of the arcuate inner extremity being such that the same conforms substantially to said grooves.

10. A device as set forth in claim 1 wherein one of said grooves is of greater depth than the other, for the purpose specified.

11. A device as set forth in claim 4 wherein one of said recesses is of greater depth than the other, for the purpose specified.

12. A device as set forth in claim 7 wherein one of said grooves is of greater depth than the other, for the purpose specified.

13. A device as set forth in claim 2 wherein the detent element is of a polygonal form in cross-section, and at least one of said grooves is V-shaped to fit an edge portion of said detent element with the V so arranged angularly in relation to the rotary movement of said journal and the slot and detent element working therein positively to limit rotation of said journal in one direction.

14. A device as set forth in claim 8 wherein one of the grooves is so shaped and arranged angularly in relation to the rotary movement of said journal and the slot and detent pin working therein positively to limit rotation of said journal in one direction.

LYLE C. ATWOOD.
HOWARD W. CLAY.

REFERENCES CITED

The following references are of record in the file of this patent:

UNITED STATES PATENTS

| Number | Name | Date |
|---|---|---|
| 2,115,284 | Pratt | Apr. 26, 1938 |
| 2,153,430 | Newman | Apr. 4, 1939 |
| 2,202,426 | Pawsat | May 28, 1940 |
| 2,447,718 | Simpson | Aug. 24, 1948 |
| 2,496,593 | Morgan | Feb. 7, 1950 |

FOREIGN PATENTS

| Number | Country | Date |
|---|---|---|
| 16,910 | Great Britain | Sept. 18, 1897 |
| 55,463 | Denmark | Nov. 14, 1938 |
| 60,356 | Norway | Jan. 23, 1939 |
| 100,814 | Sweden | Feb. 4, 1941 |
| 568,050 | France | Dec. 15, 1923 |